United States Patent Office 2,953,627
Patented Sept. 20, 1960

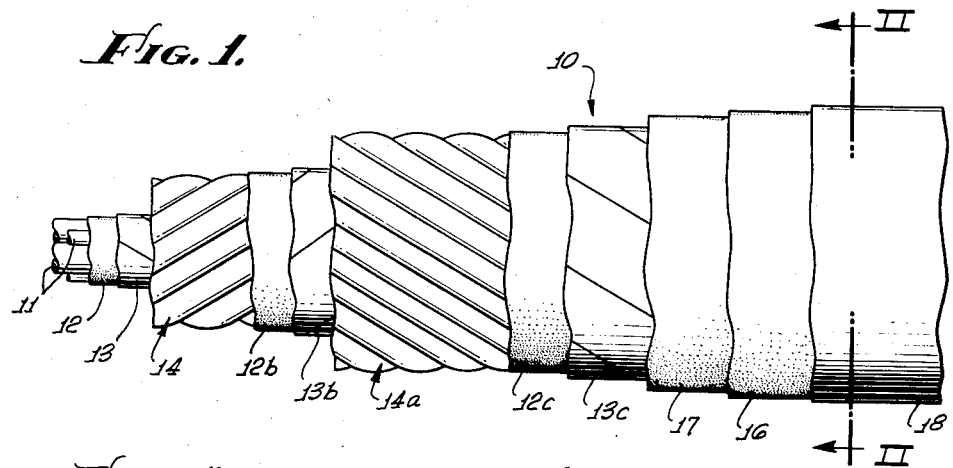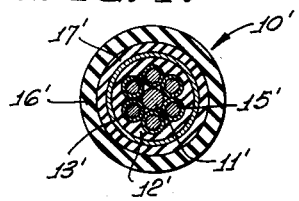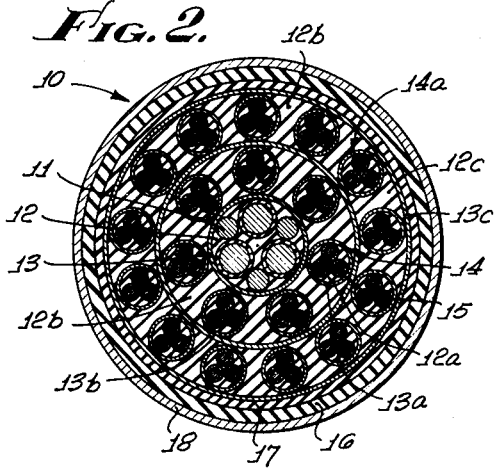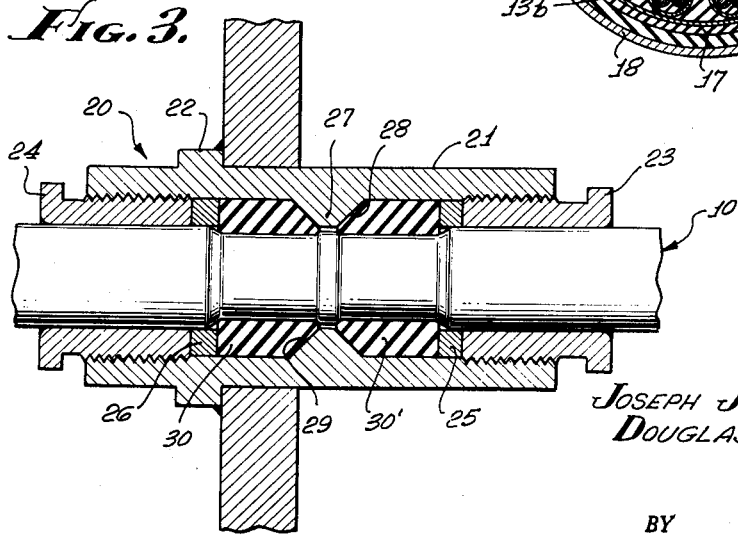

---

2,953,627

UNDERWATER ELECTRICAL CONTROL CABLE

Joseph J. Malneritch, Van Nuys, and Douglas Keeney, Arcadia, Calif., assignors to Pacific Automation Products, Inc., Glendale, Calif., a corporation of California Filed Sept. 4, 1958, Ser. No. 758,952

4 Claims. (Cl. 174—102)

The present invention relates to electrical control cables for underwater service and more particularly to an underwater cable for use between zones of differential pressures on the order of 2000 p.s.i.

There are many different types of cables in use which are laid on the ocean floor and function as communication cables. These cables are commonly referred to as submarine communication cables and are specifically constructed to have the characteristics desirable for a cable which once laid will not be subjected to continuous bending movements nor susceptible to the action of foreign elements which may damage the outer insulating jacket and thus allow water to reach the electrical conductors. In addition to the necessary electrical transmissive properties, the submarine cable must have sufficient tensile strength to support the weight in sea water of the length of cable between the ocean floor and the laying vessel as the laying operation proceeds, and it must have sufficient compressive strength to transfer the load which this weight represents to the drum over which it is payed out from the laying vessel without mechanical failure or permanent distortion at this point of extreme stress; the cable must be heavy enough to sink fast enough to keep the length of cable between the ocean floor and the pay out drum as short as possible. It may be noted that substantially all portions of a submarine cable are subjected to the same ambient pressure.

With the advent of missile launching submarines, the manufacturers of electrical control cables are confronted with an immediate and vital problem of making an electrical control cable for underwater use between the missile located on the outside of the submarine and the inside of the submarine. As the missiles are frequently launched under water, the control cables must be operative under water as well as above the surface of the water. In addition, these cables must be operative even if the insulating jacket is cut through or damaged by abrasions, shock or explosions from depth charges or encounters with hard and sharp cutting objects. Moreover, when the jacket of the control cable is damaged, the core of the cable must be so constructed as to form an impervious wall to prevent the water from travelling down through the cable and into the submarine. In relatively deep sea water, the differential in pressure between the outside and inside of a submarine is around 2000 p.s.i. and adjacent portions of a cable are therefore subjected to pressures differing greatly in magnitude.

The submarine communication cables of the prior art have been tested for possible use as an underwater control cable between a missile and the inside of a submarine and the results have been unsatisfactory. Normal submarine cables permit pressure fluids to move longitudinally and the smallest imperfection, pin hole, or cut in the jacket permits fluid flow longitudinally through the cable from a zone of higher pressure to a zone of lower pressure. The submarine communication cables are not provided nor designed with a self-sealing, inner core to act as an impervious wall when the cable jacket is damaged and therefore would be a constant danger and hazard to the occupants of a submarine when used as an electrical control cable between an outer missile and the inside of the submarine.

The present invention provides an electrical control cable for underwater service between areas of differential pressures of over 1000 p.s.i. and as high as 3000 p.s.i. and in the event the cable jacket is damaged, the effectiveness of the electrical conductors will not be impaired. Moreover, the inner core of this control cable functions as a self-sealing layer to resist the water pressure acting thereon in the event the cable jacket is damaged. This cable withstands abrasions and rough handling encountered during installation and use but yet is flexible to allow for twisting and bending during sudden underwater movements of the submarine. The cable of the present invention thus satisfies all of the requirements of an electrical control cable to be used on a missile-carrying submarine as described hereinabove. This type of cable is resilient and adapted for use with the standard Navy submarine stuffing tubes or seals through which the cable passes into the submarine. These stuffing tubes generally have means for compressing the outer jacket of the cable to provide a seal between differential pressure areas on the order of 2000 p.s.i. In contrast to the normal, heavy submarine communication cable, the control cable of the present invention is relatively light in weight and eminently suited for use on submarines, where excess weight is disadvantageous.

Generally speaking, the electrical control cable of the present invention which is adapted for underwater service between areas of differential pressure on the order of 2000 p.s.i and impervious to water pressure in the event the cable jacket is damaged, may include an axially disposed core of metallic wire surrounded by a plurality of insulated helically arranged electrical conductors. The conductors are embedded in and intimately bonded to a self-sealing synthetic rubber composition and a helically wound, overlapped layer of substantially impervious tape or sheet material covers the embedded conductors. An outer jacket of continuous preformed neoprene may be bonded to the helically wound tape by a layer of softer neoprene composition. In addition, if desirable, a continuous outer metallic jacket may be provided around the neoprene jacket.

An object of the present invention is the provision of a novel type of electrical control cable for underwater service between areas of differential pressure on the order of 2000 p.s.i.

Another object is to provide an electrical control cable for underwater service between areas of differential pressure on the order of 2000 p.s.i. and which is impervious to water pressure and longitudinal flow of water therethrough in the event the cable jacket is damaged.

Another object is the provision of an electrical control cable for underwater service which is relatively light in weight and therefore desirable for use on a submarine.

A further object of the invention is the provision of an electrical control cable for underwater use which is flexible to allow for twisting and bending during sudden movements under water at relatively high speeds.

Still another object is to provide an electrical control cable for use under water which has a self-sealing inner core to resist the flow of water therealong from a high pressure zone to a low pressure zone in the event the cable jacket is damaged.

A final object of the present invention is the provision of an underwater electrical control cable capable of performing all of the objects stated hereinabove and being constructed of materials allowing the cable to be made by a cold process whereby the inner electrical conductors can be provided with standard thermoplastic insulation.

Other objects and many of the attendant advantages of this invention will be readily appreciated as the same becomes better understood by reference to the following detailed description when considered in connection with the accompanying drawings, wherein:

Fig. 1 is a elevation, with parts broken away, of a preferred form of the invention.

Fig. 2 shows a transverse section of the cable along plane II—II of Fig. 1.

Fig. 3 illustrates a longitudinal sectional view through a submarine seal having an electrical control cable of the present invention passing therethrough.

Fig. 4 shows a transverse section of a cable made in accordance with the present invention in its simplest form.

Referring now to the drawings, wherein like reference characters designate like or corresponding parts throughout the several views, there is shown in Figs. 1 and 2 a multiconductor, flexible, electrical control cable 10 which is capable of operating while immersed in salt water under pressure and is impervious to moisture in the event the cable jacket is damaged. The cable 10 may be provided with an axially disposed preformed core including metallic wires 11 having high tensile strength which may be used as electrical conductors covered by insulation or only as longitudinal supporting members. The conductors 11 may be embedded in and bonded to a self-sealing synthetic rubber composition 12 which is impervious and resistant to water in the event that the cable jacket is damaged. The preferred continuous synthetic rubber composition or matrix 12 in which the conductors 11 are embedded should be homogeneous throughout the cable, relatively soft, self-curing, non-porous, self-sealing, non-swelling, resistant to water and hydrocarbons, and should adhere to the conductors. Polyalkaline polysulfide polymer compositions and elastomers of the type referred to in United States Letters Patent Nos. 1,890,191; 2,049,974; 2,100,351; 2,216,044; 2,466,963; 2,474,859; and 2,787,608 are adapted for use as such continuous dielectric matrix provided a minimum of solvent is used and the resulting cured body has a Shore A hardness of less than 50 and preferably 35 to 40. Neoprene and modified polychloroprenes as well as other synthetics of similar characteristics may be used in such matrix composition.

A helically wound, overlapped layer 13 of substantially impervious, compliant and elastic, synthetic sheet material preferably covers the embedded wires to form a preformed core. This elastic, synthetic material is preferably in the form of tape and may be of vinyl or polyethylene type.

The preformed core may be surrounded by a plurality of preformed conductor groups 14 helically arranged around the sheet material layer 13. Each of the conductor groups 14 may include any number of individually insulated electrical conductors 15 embedded in and bonded to a nonporous, self-curing and self-sealing synthetic rubber composition 12a of the same type as used for the self-sealing composition 12 in the preformed core. The insulation for the conductors 15 may be made of a thermoplastic material such as polyvinyl chloride or nylon. It is possible to use a thermoplastic material in either the preformed core or the preformed conductor groups as the self-sealing synthetic rubber composition is generally applied and cured by a cold process, without application of extraneous heat.

It may be desirable to cover each preformed conductor group 14 with a substantially impervious, elastic, synthetic sheet material 13a, similar to the sheet material 13 provided around the preformed core. These coverings 13 and 13a also bond to the self-sealing rubber-like compositions.

The plurality of preformed groups of conductors 14 are embedded in a self-sealing synthetic rubber composition 12b of the same type as provided for the self-sealing matrix or composition 12. The helically arranged, embedded conductor groups 14 may then be wrapped or covered by a substantially impervious, complaint, overlapped, synthetic sheet material 13b of the same type as used for covering 13 of the preformed core.

If desired, another lay of preformed conductor groups 14a may surround the sheet material 13b. Each of the conductor groups are preformed in the same manner as the conductor groups 14 and include individually insulated electrical conductors embedded in a self-sealing synthetic rubber composition. The conductor groups 14a are arranged in a contra-helical manner so no twist will be introduced into the cable as a result of the helical lay. The helically arranged conductor groups 14a are also embedded in a self-curing, synthetic rubber composition 12c, of the same type employed for the synthetic rubber composition 12. The embedded contra-helically arranged conductor groups 14a are also wrapped or covered by a substantially impervious, elastic, overlapped, synthetic sheet material 13c.

It should be noted that the number of lays of preformed conductor groups can vary according to the specifications and functions to be performed by the cable and will govern the overall outside dimension of the cable in its completed form. In the preferred embodiment of the present invention, each of the electrical conductors in the conductor groups 14 and 14a are smaller in diameter than the metallic wires 11 of the core.

Surrounding and protecting the inner core and plurality of lays of embedded conductor groups 14 and 14a, the cable is provided with a jacket 16 of continuous preformed or extruded, synthetic rubber, preferably neoprene, which is able to withstand abrasion and rough handling encountered during installation and use, twisting, bending, compression and dragging and other severe physical and chemical abuses which can be expected during normal submarine operation. The synthetic rubber jacket should exhibit no cold flow and have a Shore A hardness of over 60 to 75° F. This jacket may be bonded to elastic synthetic tape 13c by means of a softer self-sealing synthetic rubber composition 17. This bonding layer 17 exhibits cold flow and may have a Shore A hardness of less than 25.

It is sometimes desirable to provide the cable with a metallic protective jacket and therefore a stainless steel woven or braided jacket 18 may be provided around the neoprene or synthetic rubber jacket 16. It should be understood that this stainless steel jacket should also be flexible so as not to impair the desired characteristics of the electrical control cable of the present invention.

While the preferred form of the present invention is a cable as shown in Figs. 1 and 2, the simplest form of an underwater cable contemplated by the present invention is the cable 10' shown in Fig. 4. The electrical control cable 10' may include any number of individually insulated electrical conductors 15' helically wound around an axially disposed metallic wire 11' of high tensile strength. The wire 11' and helically wrapped conductors 15' are embedded in a self-sealing, synthetic rubber composition 12', of the type used for the matrix 12 in the electrical control cable 10. The embedded conductors 15' and core wire 11' may then be covered by a helically wound, overlapped, layer of substantially impervious elastic synthetic sheet material 13' of the same type as the sheet material 13 to form a self-sealing inner core. A continuous, preformed or extruded neoprene or other synthetic rubber jacket 16' may be provided around the inner core and bonded to the sheet material 13' by a bonding layer 17' of softer self-sealing, synthetic rubber.

The electrical control cable 10' shown in Fig. 4 is considered to be the simplest form of the present invention and can be modified by adding any number of lays of preformed conductor groups as illustrated by the cable 10 shown in Figs. 1 and 2.

In manufacturing the electrical control cable 10 (Figs. 1 and 2), the preformed form of the invention, the inner core is preformed by embedding the axially disposed wires 11 in the suitable self-sealing synthetic rubber composition and wrapping the embedded wires with the elastic, impervious, overlapped tape 13. Each of the conductor groups 14 are also preformed by embedding the insulated electrical conductors 15 in the self-sealing, synthetic rubber composition 12a and allowed to cure. Each of the conductor groups may be wrapped with the elastic, impervious, overlapped tape 13a. The preformed conductor groups 14 are then helically wound around the inner preformed core and embedded with another layer of self-sealing, synthetic rubber composition 12b. In some instances, it may be desirable to conduct the embedding and wrapping operations in a chamber held at subatmospheric pressure in order to enhance bonding between the component parts and preclude entrapment of air bubbles.

The preformed core and embedded conductor groups are then wrapped with the elastic, impervious, overlapped synthetic sheet material or tape 13b. An additional lay of embedded conductor groups 14a may be contra-helically wound around the sheet material 13b in a similar manner and wrapped with an impervious synthetic tape 13c.

After the helically wound tape 13c has been applied, the preformed neoprene jacket which usually has a smooth, waxy surface, is preferably expanded or placed under tension in its cured state while a stiff brush is passed through the tube to roughen the inner surface. This roughened surface allows the bonding material 17 to rigidly adhere to the jacket when it is placed over the embedded conductor groups and core and then permitted to collapse therearound, thus providing a closely fitting, bonded and water-tight seal. It should be noted that the jacket may also be applied by an extrusion process of neoprene or other synthetic rubber materials. In its collapsed form about the inner grouping, the outer jacket is preferably but not necessarily in tension circumferentially.

In Fig. 3 a sectional view is shown through a typical Navy stuffing tube or seal 20 used on submarines, etc. for receiving and retaining an electrical control cable 10 and 10' of the present invention in position between zones at different ambient pressures. This seal 20 is generally provided with an elongated sleeve body 21 which may be welded to the submarine wall at the outer transversely extending ring flange 22. The seal 20 has inner and outer gland nuts 23 and 24, which are provided with axial bores of sufficient diameters to snugly receive a selected electrical control cable. These nuts 23 and 24 are threaded into either end of the sleeve body 21 and are adapted to engage and force axially inwardly a pair of compression rings 25 and 26, respectively, which are free to slide longitudinally within the sleeve body. Rings 25 and 26 are bored to receive and allow a proper diameter electrical control cable to pass therethrough. An inwardly extending, central, circumferential seating boss 27 having inclined sides 28 and 29 is provided within the sleeve body.

Sleeves 30 and 30' preferably made of rubber composition, graphitic packing composition, neoprene, etc. are positioned on each side of boss 27 and constitute sealing members when the nuts 23 and 24 are tightened inwardly. As shown in Fig. 3, the nuts 23 and 24 are in the tightened position and therefore the sealing sleeves 30 and 30' have been deformed by compression between the rings 25 and 26, the sloping surfaces 28 and 29 of the inner boss 27 and the inner surface of the body 21. In this tightened position, the sealing sleeve have been forced radially inwardly against the outer surface of the electrical control cable 10 to provide two circumferential sealing areas which prevent any water from leaking through the seal. It should be noted that the resilient seals 30 and 30' are sufficiently compressed inwardly to assume a diameter which is slightly less than the diameter of the inner boss 27 and nuts 23 and 24. In actual use, the sealing sleeves 30 and 30' compress the outer surface of the neoprene jacket which covers the electrical control cable 10 to thereby provide a very tight and leak-proof seal.

When the electrical control cable of the present invention is specifically used in connection with the Navy type of seal or stuffing tube, it has been found that a proper seal can be obtained to withstand differential pressures on the order of over 2000 p.s.i. Even when the jacket on the cable of this invention is punctured or damaged on the high pressure side, no flow of fluid takes place longitudinally of the cable to the low pressure side. However, it should be understood that the cable of the present invention is not limited to the exemplary use but can also be used in other and diversified applications.

The electrical control cable 10 or 10' of the present invention, in addition to the characteristics set forth hereinabove, is fungus proof and is not adversely effected by short-term exposure to oils, acids, alcohols, ozone and long-term exposure to sunlight.

Obviously many modifications and variations of the present invention are possible in the light of the above teachings. It is, therefore, to be understood that within the scope of the appended claims, invention may be practised otherwise than as specifically described.

We claim:

1. A relatively lightweight, compact, flexible multi-conductor cable for underwater service, said cable having self-sealing properties to prevent longitudinal flow of water therethrough when virtually adjacent portions of such cable are subject to ambient fluid pressure differentials of between 1000 to 3000° p.s.i., comprising: an axially disposed preformed core of metallic wires of high tensile strength embedded in a nonporous, unitary, self-curing and self-sealing synthetic rubber composition adhering thereto, and a helically wound, overlapped layer of substantially impervious, elastic synthetic sheet material covering said embedded core wires, said preformed core being surrounded by a plurality of preformed conductor groups helically arranged around said preformed core, each group comprising several helically, twisted, individually insulated electrical conductors embedded in a nonporous, unitary, self-curing and self-sealing synthetic rubber composition and surrounded by a layer of substantially impervious, elastic synthetic sheet material, said core and conductor groups being embedded in a continuous, nonporous, unitary, self-curing and self-sealing synthetic rubber composition having high dielectric characteristics, all of said synthetic rubber compositions being cured and having a Shore A hardness of less than 50 and being capable of exhibiting cold flow at temperatures of 70° F.; a helically wound overlapped layer of substantially impervious, compliant and elastic synthetic sheet material covering said embedded core and conductor groups; and an outer jacket of synthetic rubber exhibiting no cold flow and having a Shore A hardness of over 60 at 75° F.

2. A cable as stated in claim 1 wherein the outer jacket is under circumferential tension, and includes a soft bonding layer between the outer jacket and the last named layer of helically wound sheet material, said soft bonding layer exhibits cold flow and a Shore A hardness of less than 25.

3. A cable as stated in claim 1 wherein said outer jacket is under circumferential tension.

4. The control cable as stated in claim 1 including a continuous outer metallic jacket surrounding said jacket.

References Cited in the file of this patent

UNITED STATES PATENTS

| | | |
|---|---|---|
| 1,654,546 | Malm | Jan. 3, 1928 |
| 1,952,191 | Arutunoff | Mar. 27, 1934 |
| 2,294,919 | Lunsford | Sept. 8, 1942 |
| 2,761,893 | Morrison | Sept. 4, 1956 |
| 2,766,614 | Cook | Oct. 16, 1956 |
| 2,881,243 | Ebel et al. | Apr. 7, 1959 |